United States Patent
Pena et al.

(10) Patent No.: US 10,485,075 B2
(45) Date of Patent: Nov. 19, 2019

(54) AUTOMOTIVE LAMP WITH COMPENSATION OF THE LUMINOUS FLUX OF THE LIGHT SOURCE

(71) Applicant: VALEO ILUMINACION, Martos (ES)

(72) Inventors: Miguel-Angel Pena, Martos (ES);
Manuel Calmaestra, Martos (ES);
Antonio Domingo Illan, Martos (ES);
Juan-Jose Santaella, Martos (ES);
Miguel Angel Cantudo, Martos (ES)

(73) Assignee: VALEO ILUMINACION, Martos (ES)

( * ) Notice: Subject to any disclaimer, the term of this patent is extended or adjusted under 35 U.S.C. 154(b) by 64 days.

(21) Appl. No.: 15/951,660

(22) Filed: Apr. 12, 2018

(65) Prior Publication Data
US 2018/0302973 A1    Oct. 18, 2018

(30) Foreign Application Priority Data

Apr. 13, 2017 (EP) .................................... 17382203

(51) Int. Cl.
*H05B 37/02* (2006.01)
*B60Q 1/00* (2006.01)
(Continued)

(52) U.S. Cl.
CPC ........... *H05B 37/02* (2013.01); *B60Q 1/0088* (2013.01); *B60Q 1/20* (2013.01); *G01K 7/021* (2013.01)

(58) Field of Classification Search
CPC ............ H05B 37/0272; H05B 37/0227; H05B 37/0281; H05B 33/0809; H05B 33/0845; H05B 33/0857; H05B 33/0872; H05B 33/0803; H05B 33/0854; H05B 37/0218; H05B 37/0245; H05B 1/0236;
(Continued)

(56) References Cited

U.S. PATENT DOCUMENTS

2002/0130786 A1    9/2002  Weindorf
2005/0099142 A1    5/2005  Cottongim et al.
(Continued)

FOREIGN PATENT DOCUMENTS

DE          100 13 041 A1    9/2001
DE     10 2006 046 729 A1    8/2008
(Continued)

OTHER PUBLICATIONS

Extended European Search Report dated Sep. 22, 2017 in European Patent Application No. 17382203.2, 10 pages.

*Primary Examiner* — Monica C King
(74) *Attorney, Agent, or Firm* — Oblon, McClelland, Maier & Neustadt, L.L.P.

(57) ABSTRACT

An automotive lamp including a light source driven by an electric current, and an electronic circuit configured to modify the electric current. The electronic circuit includes a plurality of discrete analog electronic components. The electronic circuit is configured to modify the electric current driving the light source so as to drive the light source with a first electric current IL1 or with a second electric current IL2; to switch from the first electric current IL1 to the second electric current IL2 when a temperature T of the light source increases and exceeds a first temperature level TL1inc; and to switch from the second electric current IL2 to the first electric current IL1 when the temperature T increases and exceeds a second temperature level TL2inc, where IL2 is greater than ILL and TL2inc is greater than TL1inc.

20 Claims, 5 Drawing Sheets

(51) Int. Cl.
*B60Q 1/20* (2006.01)
*G01K 7/02* (2006.01)

(58) Field of Classification Search
CPC ............ H05B 1/0244; H05B 2203/021; H05B 2203/022; H05B 33/08; H05B 33/0815; H05B 33/0842; H05B 33/089; H05B 33/0896; H05B 39/086; H05B 39/088; H05B 3/0014; H05B 3/04; H05B 3/44
See application file for complete search history.

(56) References Cited

U.S. PATENT DOCUMENTS

| | | |
|---|---|---|
| 2005/0280377 A1 | 12/2005 | Cottongim et al. |
| 2009/0033248 A1 | 2/2009 | Cottongim et al. |
| 2016/0242254 A1 | 8/2016 | Baccarin et al. |

FOREIGN PATENT DOCUMENTS

| | | |
|---|---|---|
| EP | 1 892 147 | 2/2008 |
| EP | 2 355 621 | 8/2011 |
| EP | 2 900 038 A1 | 7/2015 |
| WO | WO 2015/059675 A1 | 4/2015 |

AUTOMOTIVE LAMP WITH COMPENSATION OF THE LUMINOUS FLUX OF THE LIGHT SOURCE

TECHNICAL FIELD

The present invention relates to the field of lighting devices. More specifically, the invention relates to an automotive lamp that compensates the thermal losses of the light source and features protection against overheating of the light source.

STATE OF THE ART

It is known that among the many advantages that LED-powered light sources feature, one important advantage is that they are more efficient than halogen or xenon light sources: an LED may provide more lumens per watt than a halogen- or a xenon-powered light source. This is one of the main reasons why LED has grown in popularity among lighting devices in general. And for a similar reason, the automotive industry is also gearing towards the use of LEDs for automotive lamps.

In contrast to the advantages, a drawback of the LEDs is that the light they provide is not constant: the luminous flux radiated by an LED varies depending upon the temperature of the LED, specifically, the luminous flux decreases as the temperature of the light source increases. This behavior of the LEDs is illustrated in the datasheets that the manufacturers of LEDs provide so that a user may know how much luminous flux can be expected from an LED at a given temperature.

Since some automotive lamps are generally used when the visibility is low (e.g. at dusk, during nighttime, etc.), these may be used for long periods of time. While in use, the temperature of the LEDs of the light source starts to build up and, hence, the luminous flux the LEDs provide decreases. Accordingly, the dissipation of heat of an LED cannot be disregarded during the prototyping and production of automotive lamps because it permits the LED to provide sufficient light during long periods of time.

Notwithstanding, automotive safety regulations impose that particular automotive lamps provide light during a long period of time with slight variations in intensity, something that may be quantified with the ratio between the maximum and minimum luminous fluxes (herein referred to as flux ratio) occurring during a specific period of time. Therefore, very stringent photometrical requirements may be imposed to an automotive lamp, and these must be dealt with if the automotive lamp shall be homologated for its use.

The use of heat dissipation techniques in an automotive lamp (when using an LED as light source) generally proves insufficient for ensuring that the flux ratio will be within the acceptable range laid down in the automotive safety regulations. Thus a way to deal with the problem of having a variable flux coming from the LED is by adjusting the electric current driving the LED: supplying a higher electric current to the LED more luminous flux is radiated, but in exchange the temperature of the light source increases more rapidly. There have been several attempts in the prior art to compensate the thermal losses of a light source following this approach.

International application WO 2015/059675 A1 relates to an automotive lamp with an electronic circuit that controls the electric current driving an LED of the lamp so as to compensate the variations in the luminous flux due to temperature. The circuit is provided with a feedback loop for adjusting the current driving the LED based on a compensating function and the temperature of the LED, therefore the electric current may be continuously modified in accordance with the current luminous flux radiated by the LED and the flux may be maintained substantially steady.

European patent application EP 2355621 A2 discloses an electronic circuit that adjusts the electric current supplied to one or more LEDs of an automotive lamp. The circuit allegedly adjusts the electric current so as to compensate the variation in the luminous flux radiated by the LEDs with respect to the temperature thereof; the circuit may even protect the LEDs from overheating by modifying the intensity of an electric current to a lower one. The European patent application, however, does not disclose how the circuit is actually implemented.

There is an interest in providing an automotive lamp with one or more semiconductor-based light sources that may provide a substantially constant luminous flux, and which furthermore may comply with a stringent flux ratio. Accordingly, it would be desirable to have a cost-effective electronic circuit that may compensate the losses in luminous flux due to the increase in temperature of the semiconductor-based light source/s and that may protect the semiconductor-based light source/s from overheating.

DESCRIPTION OF THE INVENTION

A first aspect of the invention relates to an automotive lamp comprising: a light source driven by an electric current; and an electronic circuit configured to modify the electric current driving the light source; the electronic circuit comprises a plurality of discrete analog electronic components; the electronic circuit is configured: to modify the electric current driving the light source so as to drive the light source with a first electric current IL1 or with a second electric current IL2; to switch from the first electric current IL1 to the second electric current IL2 when a temperature T of the light source increases and exceeds a first temperature level TL1inc; and to switch from the second electric current IL2 to the first electric current IL1 when the temperature T increases and exceeds a second temperature level TL2inc; the second electric current IL2 being greater than the first electric current IL1; and the second temperature level TL2inc being greater than the first temperature level TL1inc.

Electric power is supplied to the light source by a power source in the form of an electric current that the electronic circuit modifies depending on the temperature T of the light source. In some embodiments, the power source is provided as part of the automotive lamp. It may also be provided as a source of electric power generation within a motor vehicle, such as an alternator or a battery.

The power source provides a voltage potential to a current driver circuit to which the electronic circuit and the light source are both connected. The current driver circuit produces an electric current for driving the light source. The electronic circuit modifies the electric current that drives the light source by providing an impedance that may vary between two values and, hence, drive the light source with the first electric current IL1 or with the second electric current IL2. A temperature sensor (for example, but without limitation, a thermistor) senses the temperature of the light source and provides a voltage or a current indicative of the sensed temperature to the electronic circuit, which in turn varies the impedance from a first value to a second value or vice versa thereby switching from the first electric current IL1 to the second electric current IL2 or vice versa.

The electronic circuit is configured to vary the impedance from the first value to a second value when the temperature of the light source as sensed by the temperature sensor increases and exceeds the first temperature level TL1inc, that is, when the voltage or current the sensor provides is indicative of an increasing temperature that additionally exceeds the first temperature level TL1inc (according to the transfer function of the particular temperature sensor). Accordingly, the electronic circuit switches the current driving the light source from the first electric current IL1 to the second electric current IL2. For example but without limitation, one of the first and second values of the impedance may correspond to an open circuit.

Since the temperature of the light source generally increases, the luminous flux provided by the light source is expected to reduce, therefore by switching to an electric current of a higher intensity (the second electric current IL2), the thermal losses of the light source may be compensated so that a substantially constant luminous flux is provided. For example, this may alleviate the difference in luminous flux the light source provides when it is first activated (the light source is cool during the first few seconds or minutes, e.g. 10 seconds, 30 seconds, 1 minute, 2 minutes, etc.) with respect to the luminous flux after several minutes (e.g. 10 minutes, 20 minutes, 30 minutes, 40 minutes, etc.) since that is when it is already hot due to the prolonged operation. Without modifying the electric current, the flux ratio computed with the luminous flux after, for example, 1 minute and after 30 minutes (time values that are used for the homologation of some automotive lamps) could be outside of the permissible range; this would mean that the luminous flux at minute 1 was greater than the luminous flux at minute 30 in a way that exceeds the regulation.

As the light source is in operation, the heat generally builds up in the light source itself and/or the substrate on which it is installed, and at a rate that depends on the heat dissipation means provided. The heat also increases more rapidly as the electric current driving the light source is of a higher intensity, so simply compensating the thermal losses in luminous flux by increasing the electric current is not a long-term solution: the light source would eventually burn out or even explode. In this regard, the electronic circuit further provides protection to the light source against overheating by driving it with an electric current of lower intensity (the first electric current IL1) when the temperature T of the light source is excessive. Since the temperature of the light source is high and the electric current driving it is lower, the luminous flux provided may be less than the minimum value for driving safely, but in exchange the life of the light source may be extended.

The electronic circuit is configured to vary the impedance from the second value to a first value when the temperature of the light source as sensed by the temperature sensor increases and exceeds the second temperature level TL2inc, that is, when the voltage or current the sensor provides is indicative of an increasing temperature that additionally exceeds the second temperature level TL2inc (according to the transfer function of the particular temperature sensor). Accordingly, the electronic circuit switches the current driving the light source from the second electric current IL2 to the first electric current IL1.

In preferred embodiments of the invention, the electronic circuit is further configured to switch from the first electric current IL1 to the second electric current IL2 when the temperature T decreases and is less than a third temperature level TL2dec; and to switch from the second electric current IL2 to the first electric current IL1 when the temperature T decreases and is less than a fourth temperature level TL1dec; wherein the third temperature level TL2dec is greater than the fourth temperature level TL1dec.

It may happen that, at some point, the light source is so hot that it would require too much electric current to compensate the losses in luminous flux. In such case, the electric current driving the light source may be lower either to avoid overheating or to save electric power. However, when the temperature T of the light source starts to decrease such that the risk that the light source will burn out or explode is reduced, and that the electric current that the light source needs to provide the required luminous flux is acceptable (for instance when the temperature T is below the third temperature level TL2dec), the electronic circuit may switch the electric current that drives the light source from the first electric current IL1 to the second electric current IL2 and thus increase the luminous flux provided by the light source.

Similarly, when the temperature T of the light source decreases sufficiently such that the light source is substantially cool (for instance when the temperature T is below the fourth temperature level TL1dec), the electronic circuit may switch the electric current that drives the light source from the second electric current IL2 to the first electric current IL1. In this way, the luminous flux provided by the light source may be maintained substantially constant as no thermal losses need be compensated.

Preferably, in these embodiments, the second temperature level TL2inc is greater than the third temperature level TL2dec; the third temperature level TL2dec is greater than the first temperature level TL1inc; and the first temperature level TL1inc is greater than the fourth temperature level TL1dec. Namely, following this nomenclature:

TL2inc>TL2dec>TL1inc>TL1dec

The electronic circuit is configured with hysteresis so that minor temperature variations around any of the temperature levels do not lead to constant switching between the first electric current IL1 and the second electric current IL2.

In some of these embodiments, the plurality of discrete analog electronic components comprises a plurality of resistors configured to adjust a value of each of the first, second, third and fourth temperature levels TL1inc, TL2inc, TL2dec and TL1dec. Some of the discrete analog electronic components may be, for example, resistors, the value of which may be selected to adjust the temperature levels at which the electronic circuit switches the electric current driving the light source. If one, some or all of the temperature levels need be modified when the automotive lamp is already manufactured, the necessary discrete analog electronic components may be selected and a user may replace the components already in place (i.e. desoldering the former components and soldering the new ones).

In some embodiments, the light source comprises at least one semiconductor-based light source; the at least one semiconductor-based light source comprises one of: at least one LED, at least one OLED (i.e. organic light emitting diode), and at least one laser. In some of these embodiments, the light source comprises a branch of a plurality of semiconductor-based light sources including two or more LED or OLED chips. In this sense, the electronic circuit may modify the electric current driving the two or more LEDs or OLEDs.

In some embodiments, the automotive lamp further comprises a thermistor configured to sense the temperature T of one of the at least one semiconductor-based light source, the branch of a plurality of semiconductor-based light sources or a substrate of the light source. That is, the temperature sensor of the automotive lamp may comprise a thermistor that senses the temperature T directly from one semiconductor-based light source, or from the substrate where the one or more semiconductor-based light sources are installed.

It may be convenient to sense the temperature from the substrate since, generally, it is a substrate common to the semiconductor-based light sources there may be installed (in those embodiments in which the light source comprises more than one semiconductor-based light sources) and thus it may provide an average temperature of the semiconductor-based light sources. Preferably, the thermistor is of the NTC (i.e. negative temperature coefficient) type, however other types of thermistor are possible as well without departing from the scope of the present disclosure.

In preferred embodiments of the invention, the electronic circuit does not comprise a microcontroller. The electronic circuit is capable of modifying the electric current driving the light source so as to compensate the thermal losses of the light source and to protect against overheating of the light source without any microcontroller that would increase the cost of the electronic circuit itself and the overall cost of the automotive lamp.

In some embodiments, the automotive lamp is a rear fog lamp for a motor vehicle.

The rear fog lamp of a motor vehicle generally has particularly demanding homologation requirements in terms of flux ratio. The rear fog lamp produces a really bright light that aids in identifying other vehicles ahead when there is fog. Accordingly, for a rear fog lamp to be certified for its use on a motor vehicle, it is required that its flux ratio at some particular time instants is within a (demanding) range (otherwise the light provided by the lamp would be excessively too bright in some occasions, for example when the lamp is cool, or too dim in some other occasions, for example when the lamp is hot, both situations being not appropriate for driving safely). In this regard, the electronic circuit of the present disclosure permits that a rear fog lamp for a motor vehicle, wherein the lamp includes a light source in the form of one or more semiconductor-based light sources, may fulfill the flux ratio required for passing the certification.

A second aspect of the invention relates to a motor vehicle comprising a rear fog lamp, wherein the rear fog lamp comprises an automotive lamp according to the first aspect of the invention.

A third aspect of the invention relates to a method for driving a light source of an automotive lamp, the method being implemented in an electronic circuit comprising a plurality of discrete analog electronic components, the method comprising: driving the light source with a first electric current IL1; switching from the first electric current IL1 to a second electric current IL2 when a temperature T of the light source increases and exceeds a first temperature level TL1inc, and switching from the second electric current IL2 to the first electric current IL1 when the temperature T increases and exceeds a second temperature level TL2inc; wherein the second electric current IL2 is greater than the first electric current IL1; and wherein the second temperature level TL2inc is greater than the first temperature level TL1inc.

The electronic circuit behaves as an impedance that varies between a first value and a second value, and by adjusting this impedance the method is carried out. A power source provides a voltage to a current driver circuit that is connected to the electronic circuit and the light source. This voltage in the current driver circuit produces an electric current for driving the light source. In some embodiments, the power source is provided as part of the automotive lamp.

It may also be provided as a source of electric power generation within a motor vehicle, such as an alternator or a battery.

Initially, the electric current driving the light source is the first electric current IL1 (that depends upon the value of the impedance resulting from the electronic circuit).

The temperature T of the light source is sensed with a temperature sensor, and when the temperature T increases and is greater than the first temperature level TL1inc, the electric current driving the light source is switched from the first electric current IL1 to the second electric current IL2 (by adjusting the impedance resulting from the electronic circuit). By driving the light source in this way, namely with an electric current of a higher intensity when the temperature of the light source has increased, the luminous flux provided may be maintained substantially constant as the losses due to the thermal increase are compensated with additional electric current.

Similarly, if the temperature T keeps increasing and becomes greater than the second temperature level TL2inc, the electric current driving the light source is switched from the second electric current IL2 to the first electric current IL1. By driving the light source in this way, namely with an electric current of a lower intensity when the temperature of the light source has increased even more (since the second temperature level TL2inc is greater than the first temperature level TL1inc), the light source is protected from overheating and thus the life thereof may be extended.

In preferred embodiments of the invention, the method further comprises switching from the first electric current IL1 to the second electric current IL2 when the temperature T decreases and is less than a third temperature level TL2dec; and switching from the second electric current IL2 to the first electric current IL1 when the temperature T decreases and is less than a fourth temperature level TL1dec; wherein the third temperature level TL2dec is greater than the fourth temperature level TL1dec.

The temperature T of the light source is sensed with the temperature sensor, and when the temperature T decreases and is below the third temperature level TL2dec, the electric current driving the light source is switched from the first electric current IL1 to the second electric current IL2 (by adjusting the impedance resulting from the electronic circuit). By driving the light source in this way, namely with an electric current of a higher intensity when the temperature of the light source has decreased, the luminous flux provided may be increased as the prior first electric current IL1 could be driving the light source so as to avoid overheating of the same (so a low luminous flux was being provided).

Similarly, if the temperature T keeps decreasing and becomes less than the fourth temperature level TL1dec, the electric current driving the light source is switched from the second electric current IL2 to the first electric current IL1. By driving the light source in this way, namely with an electric current of a lower intensity when the temperature of the light source has decreased even more (since the third temperature level TL2dec is greater than the fourth temperature level TL1dec), the light source may provide a substantially constant luminous flux as no thermal losses need be compensated.

Preferably, in these embodiments, the second temperature level TL2inc is greater than the third temperature level TL2dec; the third temperature level TL2dec is greater than the first temperature level TL1inc; and the first temperature level TL1inc is greater than the fourth temperature level TL1dec.

In some embodiments, the plurality of discrete analog electronic components comprises a plurality of resistors, and the method further comprises: selecting a resistor for each of the resistors of the plurality of resistors to adjust a value of each of the first, second, third and fourth temperature levels TL1inc, TL2inc, TL2dec and TL1dec.

In some embodiments of the invention, the light source comprises at least one semiconductor-based light source (e.g. at least one LED, at least one OLED, at least one laser) or a branch of a plurality of semiconductor-based light sources, and the method further comprises: providing a thermistor for sensing the temperature T in one of the at least one semiconductor-based light source, the branch of a plurality of semiconductor-based light sources, or a substrate of the light source.

Further, similar advantages as those described for the first aspect of the invention may also be applicable to the third aspect of the invention.

A fourth aspect of the invention relates to a method for producing an automotive lamp, the method comprising: providing a light source; and connecting an electronic circuit to drive the light source according to the third aspect of the invention.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DESCRIPTION OF A WAY OF CARRYING OUT THE INVENTION

Figure 1:
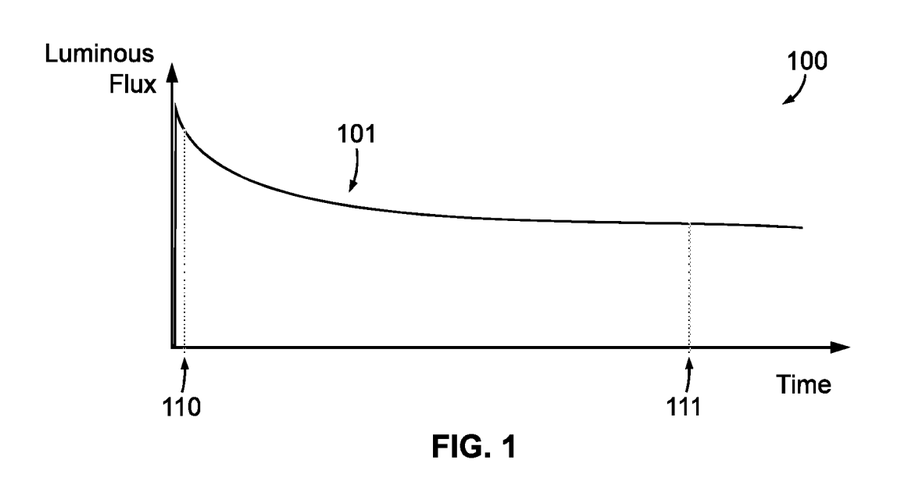
FIG. 1 shows a time evolution of a luminous flux provided by an LED-powered automotive lamp with no compensation of thermal losses.

FIG. 1 shows, on a graph 100, a time evolution of a luminous flux 101 provided by an automotive lamp comprising at least one LED as light source when there is no compensation of the losses in luminous flux due to an increasing temperature of the light source.

It can be appreciated that there is a reduction of the luminous flux 101 between a first time instant 110 (when the light source is still cool or at an ambient temperature, e.g. after 1 minute of being activated) and a second time instant 111 (when the light source is already hot due to its prolonged operation, e.g. after 30 minutes of use). The reduction in the luminous flux 101 at the second time instant 111 may be, for example, 10% or more, 15% or more, 20% or more, 25% or even more with respect to the luminous flux 101 at the first time instant 110; for example the luminous flux 101 at the second time instant 111 may be 95 lumens while at the first time instant 110 the luminous flux 101 may be 115 lumens. As the temperature of the light source increases, the luminous flux 101 provided by the light source decreases, therefore this variation in luminous flux needs be compensated to ensure that an automotive lamp provides light in a manner substantially constant and regular. Even if the amount of lumens provided by the automotive lamp at the second time instant 111 are sufficient to comply with the minimum safety regulations, the temporal variation in luminous flux may not be permissible.

Figure 2:
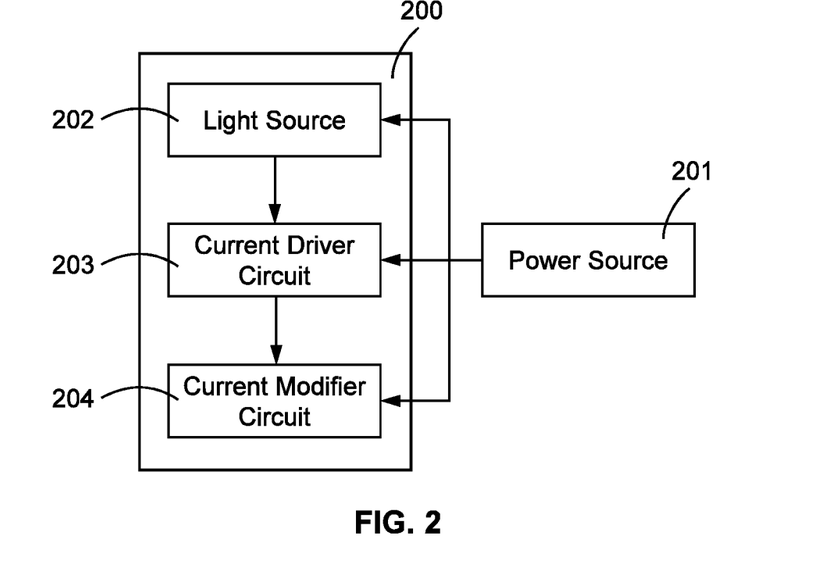
FIG. 2 shows in a block diagram form an automotive lamp in accordance with an embodiment of the invention.

FIG. 2 shows a block diagram of an automotive lamp 200 in accordance with an embodiment of the invention. The automotive lamp 200 may include a light source 202, a current driver circuit 203 for producing an electric current that will drive the light source 202, and a current modifier circuit 204.

The light source 202 may include at least one semiconductor-based light sources, such as one LED, two LEDs, or even more than two LEDs, for example but without limitation, five LEDs, or ten LEDs.

Figure 7:
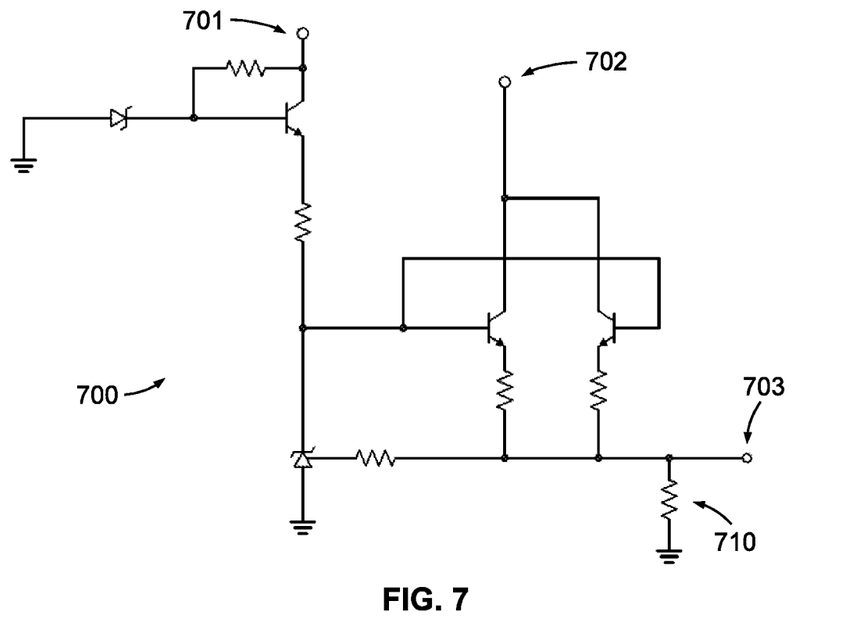
FIG. 7 shows a current driver circuit suitable for an automotive lamp in accordance with an embodiment of the invention.
Figure 8A:
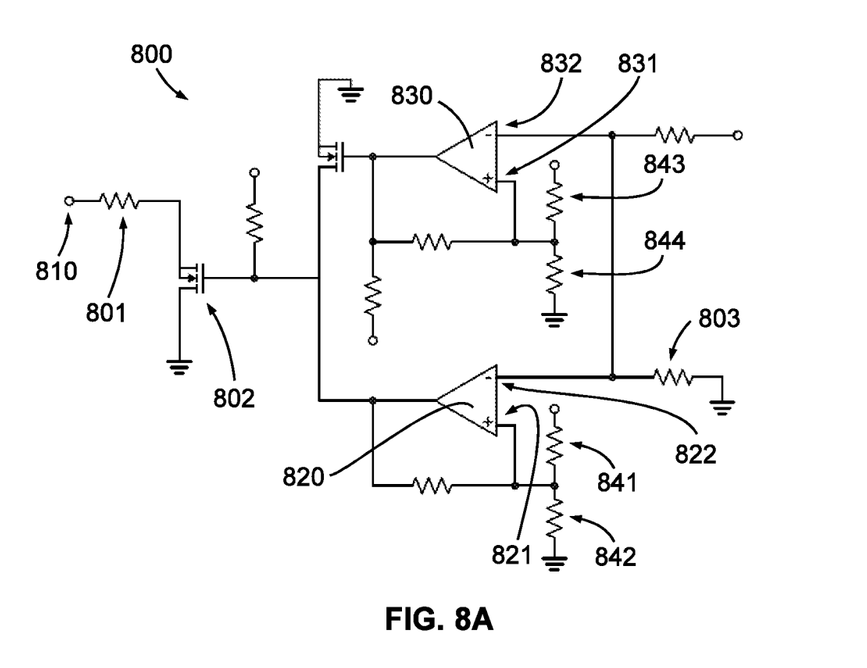
FIGS. 8A-8B show two current modifier circuits of automotive lamps in accordance with embodiments of the invention.
Figure 8B:
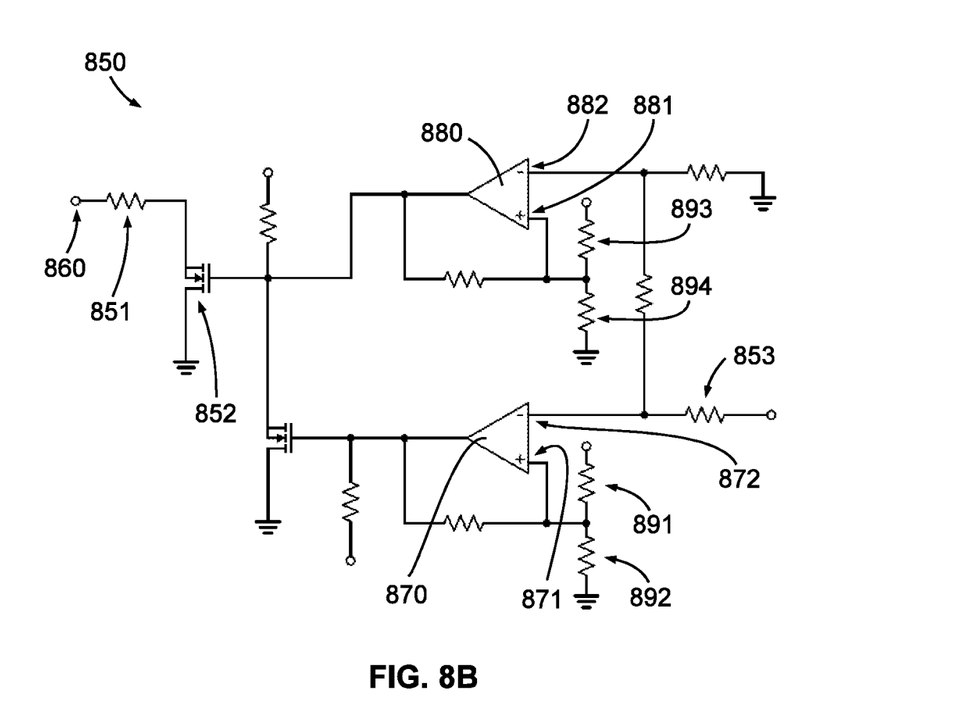

The electronic circuit that acts as the current modifier circuit 204 is connected to the current driver circuit 203 so as to modify the electric current driving the light source 202. This, in turn, results in the compensation of the losses in luminous flux of the light source 202 and protection of the light source 202 against overheating. An exemplary implementation of the current driver circuit 203 is shown in FIG. 7, and two exemplary implementations of the current modifier circuit 204 are shown in FIGS. 8A-8B.

A power source 201 of a motor vehicle (a source of electric power generation within a motor vehicle, e.g. an alternator or a battery) provides electric power to the automotive lamp 200. In other non-illustrated embodiments, the automotive lamp may also include a power source. The power source 201 is electrically connected to the light source 202, the current driver circuit 203, and the current modifier circuit 204.

Figure 3:
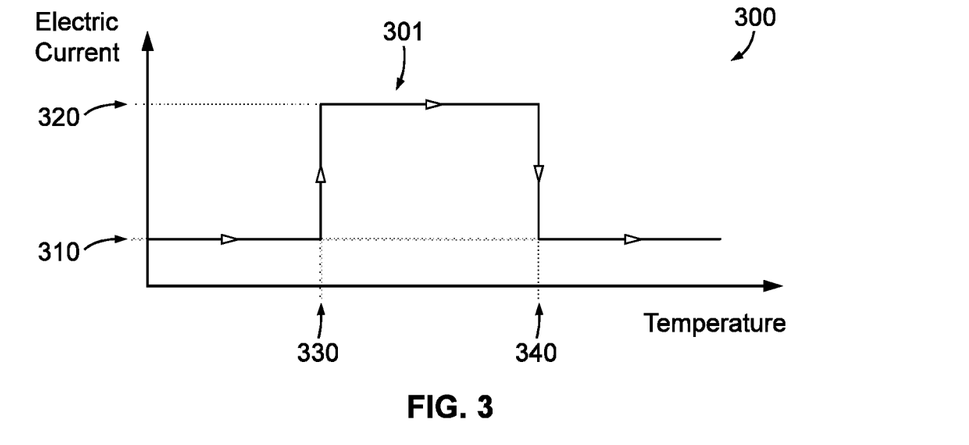
FIG. 3 shows a modification of an electric current in accordance with an embodiment of the invention.

FIG. 3 shows, on a graph 300, an evolution of an electric current 301 driving a light source (of an automotive lamp in accordance with an embodiment of the invention) versus temperature. The electric current 301 is illustrated on the graph 300 with arrows that indicate the trend in which an electronic circuit of the automotive lamp modifies the electric current.

The electronic circuit modifies the electric current driving the light source by switching between a first electric current 310 and a second electric current 320 in order to compensate for the thermal losses in luminous flux of the light source and to protect the light source against overheating.

Particularly, when the temperature of the light source is less than a first temperature level 330, the light source is driven with the first electric current 310 that is lower in intensity than the second electric current 320. When the temperature increases and exceeds the first temperature level 330, the electronic circuit varies its impedance thereby switching the electric current 301 that drives the light source from the first electric current 310 to the second electric current 320.

Prior to the electric current being switched, the luminous flux that was being provided by the light source may have decreased with respect to the luminous flux that was being provided right when the light source had been activated (this fact can be appreciated in the time evolution of FIG. 1). Therefore, upon switching to the second electric current 320 (higher in intensity), the luminous flux provided by the light source increases. By varying the temperature level 330, the first electric current 310, and the second electric current 320, the luminous flux may be maintained substantially constant; these values may have to be tuned according to the behavior of the light source (that depends on the temperature, the electric current driving it, and the luminous flux it provides based on these magnitudes).

Further, if the temperature of the light source keeps increasing (something that could be expected since the light source may be operating for a long period of time and with an electric current of high intensity) and exceeds a second temperature level 340, the electronic circuit again varies its impedance so as to switch the electric current 301 from the second electric current 320 to the first electric current 310. This change in electric current 301 protects the light source from overheating due to an electric current of a high intensity (such as the second electric current 320) and hence the life thereof may be extended.

Figure 4:
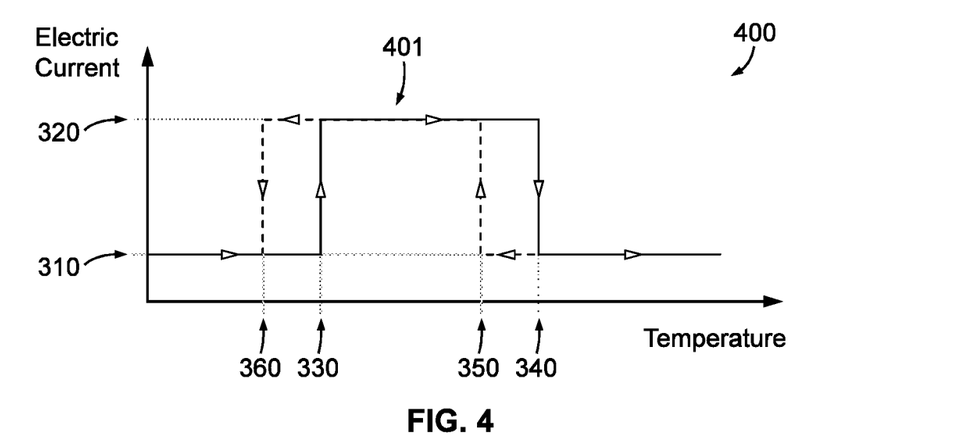
FIG. 4 shows a modification of an electric current in accordance with another embodiment of the invention.

FIG. 4 shows, on a graph 400 similar to graph 300 of FIG. 3, an evolution of an electric current 401 driving a light source (of an automotive lamp in accordance with another embodiment of the invention) versus temperature.

An electronic circuit (acting as a current modifier circuit) of the automotive lamp provides the same response as the electronic circuit of the automotive lamp of FIG. 3 when the temperature of the light source increases (that is, the electronic circuit switches between the first and second electric currents 310 and 320 when the first and second temperature levels 330 and 340 are exceeded). In contrast to the response of FIG. 3, the electronic circuit whose response is shown in FIG. 4 also modifies the electric current driving the light source when the temperature of the light source decreases (this is represented with dashed lines and arrows pointing to the left for illustrative purposes only).

When the temperature of the light source decreases and goes below a third temperature level 350 (that is lower than the second temperature level 340 but greater than the first temperature level 310), the electronic circuit varies its impedance so as to switch the electric current 301 from the first electric current 310 to the second electric current 320 thereby increasing the luminous flux the light source radiates.

Further, if the temperature decreases even more and goes below a fourth temperature level 360 (that is lower than the first temperature level 310), the electronic circuit varies its impedance so as to switch the electric current 301 from the second electric current 320 to the first electric current 310. Since the light source is cooler, the electric current it needs for providing a substantially constant luminous flux may be of a lower intensity.

Figure 5:
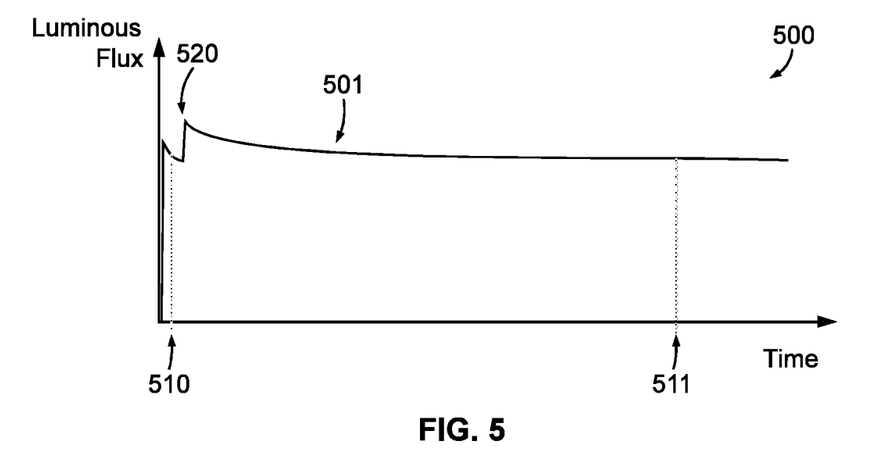
FIG. 5 shows a time evolution of a luminous flux provided by an automotive lamp in accordance with an embodiment of the invention.

FIG. 5 shows, on a graph 500, a time evolution of a luminous flux 501 provided by an automotive lamp comprising at least one LED as light source and an electronic circuit for compensating the thermal losses in luminous flux due to an increase in temperature of the at least one LED.

The initial trend of the luminous flux 501 is the same as the luminous flux 101 of FIG. 1, however as the luminous flux 501 starts to decay, the electronic circuit of the automotive lamp switches (indicated with marker 520) the electric current driving the light source to an electric current of a higher intensity. Accordingly, the luminous flux 501 at a first time instant 510 (when the light source is still cool or at an ambient temperature, e.g. after 1 minute of being activated) is substantially similar to the luminous flux 501 at a second time instant 511 (when the light source is already heated due to its prolonged operation, e.g. after 30 minutes of use), so the difference of the luminous flux 501 at the second time instant 511 with respect to the luminous flux 501 at the first time instant 510 may be, for example, 10% or less, 7% or less, 5% or even less, such as −5% (i.e. minus 5%).

Figure 6:
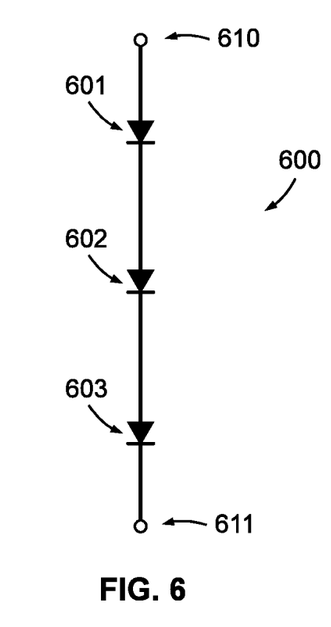
FIG. 6 shows in a block diagram form a light source of an automotive lamp in accordance with an embodiment of the invention.

FIG. 6 shows a light source 600 of an automotive lamp in accordance with an embodiment. The light source 600 includes at least one LED, particularly a branch of a plurality of three LEDs 601-603 connected in series; in other embodiments, the LEDs may be connected in parallel.

The light source 600 further includes a first terminal 610 to which a power source may be connected (for instance the power source 201 of FIG. 2), and a second terminal 611 to which a current driver circuit may be connected (for instance the current driver circuit 203 of FIG. 2) for producing the electric current that will drive the three LEDs 601-603.

FIG. 7 shows an electronic circuit 700 of a current driver circuit that may be used, for example, as the current driver circuit 203 of FIG. 2.

The electronic circuit 700 includes a first terminal 701 where a voltage from a power source is provided, a second terminal 702 where a light source is connectable to, and a third terminal 703 where a current modifier circuit is connectable to. The electronic circuit 700 also includes a resistor 710 (generally referred to as Rbin). An impedance at the third terminal 703 determines the intensity of the electric current that is produced within the electronic circuit 700 and which will drive the light source, therefore the resistor 710 together with the impedance of the current modifier circuit connectable to the third terminal 703 will affect the intensity of the electric current.

It is readily apparent that the electronic circuit 700 is an exemplary implementation of a current driver circuit and hence other implementations may be possible without departing from the scope of the present disclosure.

FIGS. 8A-8B show electronic circuits 800 and 850 of two current modifier circuits that may be used, for example, as the current modifier circuit 204 of FIG. 2.

The electronic circuit 800 of FIG. 8A is provided with a terminal 810 for connection to a current driver circuit (such as the one of FIG. 7). The electronic circuit 800 includes a resistor 801 that will affect the electric current driving the light source, and a transistor 802 that acts as a switch: when the transistor 802 is on the electric current driving a resistor Rbin (of a current driver circuit) is affected by the resistor 801 (as a resistor in shunt with the resistor Rbin), and when the transistor 802 is off the electric current driving the resistor Rbin will not be affected by the resistor 801 since the whole electronic circuit 800 acts as an open circuit.

The electronic circuit 800 further includes a plurality of discrete analog electronic components that determine the temperature levels at which the current modifier circuit switches between the first and second electric currents. The electronic circuit 800 also includes a resistor 803 that provides the temperature of the light source sensed by a temperature sensor (e.g. an NTC thermistor), and two voltage comparators 820 and 830.

At low temperatures, the electric current that drives the light source should be of a lower intensity. By making voltage 821 greater than voltage 822 (inputs of the comparator 820), and voltage 831 lower than voltage 832 (inputs of the comparator 830), the transistor 802 remains switched off and thus the equivalent impedance of the whole electronic circuit 800 is an open circuit. As the temperature of the light source increases, the voltage 822 decreases, and when it becomes lower than the voltage 821 (at a temperature greater than a first temperature level), the transistor 802 is switched on. If the temperature keeps increasing, at one point (at a temperature greater than a second temperature level) the voltage 832 becomes lower than the voltage 831, and the transistor 802 is switched off again.

Since the electronic circuit 800 is configured with hysteresis, when the temperature of the light source decreases, the transistor 802 may switch between on and off states at temperatures different from the first and second temperature levels, particularly at third and fourth temperature levels as described above with respect to FIG. 4.

In this respect, resistors 841, 842 may be selected in order to adjust the operation of the electronic circuit 800 so as to compensate the thermal losses of the light source, whereas resistors 843, 844 may be selected in order to adjust the operation of the electronic circuit 800 so as to thermally protect the light source.

Regarding the electronic circuit 850 of FIG. 8B, it behaves in a way similar to the electronic circuit 800. The electronic circuit 850 includes a terminal 860 for connection to a current driver circuit, a resistor 851 that affects the electric current driving the light source, a transistor 852 that makes the electronic circuit 850 switch between first and second electric currents, two voltage comparators 870 and 880, and a plurality of discrete analog electronic components. In this example, a resistor 853 indicates the temperature of the light source as sensed by a temperature sensor.

When voltage 871 is greater than voltage 872 (inputs of the comparator 870), and voltage 881 is greater than voltage 882 (inputs of the comparator 880), for instance at low temperatures, the transistor 852 remains switched off and therefore it produces an open circuit. As the temperature of the light source increases, so does the voltage 872, and when the voltage 872 becomes greater than the voltage 871 (at a temperature greater than a first temperature level), the transistor 852 is switched on and the resistor 851 is in parallel with a resistor Rbin of a current driver circuit connected to the terminal 860. At higher temperatures, the voltage 882 increases and when it becomes greater than the voltage 881 (at a temperature greater than a second temperature level), the transistor 852 is switched off.

Since the electronic circuit 850 is configured with hysteresis, when the temperature of the light source decreases, the transistor 852 may switch between on and off states at temperatures different from the first and second temperature levels, particularly at third and fourth temperature levels as described above with respect to FIG. 4.

In this respect, resistors 891, 892 may be selected in order to adjust the operation of the electronic circuit 850 so as to compensate the thermal losses of the light source, whereas resistors 893, 894 may be selected in order to adjust the operation of the electronic circuit 850 so as to thermally protect the light source.

It is readily apparent that the electronic circuits 800 and 850 are exemplary implementations of a current modifier circuit and hence other implementations may be possible without departing from the scope of the present disclosure.

Further, it is also readily apparent that different terminals of the electronic circuits 700, 800 and 850 that have not been described may be provided with different voltages. Similarly, despite not being explicitly illustrated, the active components of the electronic circuits 700, 800 and 850 are electrically powered.

Even though the terms first, second, third, etc. have been used herein to describe several variables, it will be understood that the variables should not be limited by these terms since the terms are only used to distinguish one variable from another. For example, the first electric current IL1 could as well be named second electric current IL1 and the second electric current IL2 could be named first electric current IL2 without departing from the scope of this disclosure.

In this text, the term "comprises" and its derivations (such as "comprising", etc.) should not be understood in an excluding sense, that is, these terms should not be interpreted as excluding the possibility that what is described and defined may include further elements, steps, etc.

The invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. An automotive lamp comprising:
   a light source driven by an electric current; and
   an electronic circuit configured to modify the electric current driving the light source; wherein
   the electronic circuit comprises a plurality of discrete analog electronic components;
   the electronic circuit is configured:
   to modify the electric current driving the light source so as to drive the light source with a first electric current IL1 or with a second electric current IL2;
   to switch from the first electric current IL1 to the second electric current IL2 when a temperature T of the light source increases and exceeds a first temperature level TL1inc (330); and
   to switch from the second electric current IL2 to the first electric current IL1 when the temperature T increases and exceeds a second temperature level TL2inc;
   the second electric current IL2 is greater than the first electric current IL1; and
   the second temperature level TL2inc is greater than the first temperature level TL1inc.

2. The automotive lamp of claim 1, wherein the electronic circuit is further configured:
   to switch from the first electric current IL1 to the second electric current IL2 when the temperature T decreases and is less than a third temperature level TL2dec; and
   to switch from the second electric current IL2 to the first electric current IL1 when the temperature T decreases and is less than a fourth temperature level TL1dec;
   wherein the third temperature level TL2dec is greater than the fourth temperature level TL1dec.

3. The automotive lamp of claim 2, wherein:
   the second temperature level TL2inc is greater than the third temperature level TL2dec;
   the third temperature level TL2dec is greater than the first temperature level TL1inc; and
   the first temperature level TL1inc is greater than the fourth temperature level TL1dec.

4. The automotive lamp of claim 3, wherein the plurality of discrete analog electronic components comprises a plurality of resistors configured to adjust a value of each of the first, second, third and fourth temperature levels TL1inc, TL2inc, TL2dec and TL1dec.

5. The automotive lamp of claim 1, wherein the light source comprises a branch of a plurality of semiconductor-based light sources.

6. The automotive lamp of claim 5, further comprising a thermistor configured to sense the temperature T of the branch of a plurality of semiconductor-based light sources or a substrate of the light source.

7. The automotive lamp of claim 1, wherein the electronic circuit does not comprise a microcontroller.

8. The automotive lamp of claim 1, wherein the automotive lamp is a rear fog lamp for a motor vehicle.

9. A motor vehicle comprising a rear fog lamp, the rear fog lamp comprising an automotive lamp of claim 1.

10. A method for driving a light source of an automotive lamp, the method being implemented in an electronic circuit comprising a plurality of discrete analog electronic components, the method comprising:
   driving the light source with a first electric current IL1;
   switching from the first electric current IL1 to a second electric current IL2 when a temperature T of the light source increases and exceeds a first temperature level TL1inc; and
   switching from the second electric current IL2 to the first electric current IL1 when the temperature T increases and exceeds a second temperature level TL2inc;
   wherein the second electric current IL2 is greater than the first electric current IL1; and
   wherein the second temperature level TL2inc is greater than the first temperature level TL1inc.

11. The method of claim 10, further comprising:
   switching from the first electric current IL1 to the second electric current IL2 when the temperature T decreases and is less than a third temperature level TL2dec; and
   switching from the second electric current IL2 to the first electric current IL1 when the temperature T decreases and is less than a fourth temperature level TL1dec;
   wherein the third temperature level TL2dec is greater than the fourth temperature level TL1dec.

12. The method of claim 11, wherein:
   the second temperature level TL2inc is greater than the third temperature level TL2dec;
   the third temperature level TL2dec is greater than the first temperature level TL1inc; and
   the first temperature level TL1inc is greater than the fourth temperature level TL1dec.

13. The method of claim 12, wherein the plurality of discrete analog electronic components comprises a plurality of resistors, and the method further comprises: selecting a resistor for each of the resistors of the plurality of resistors to adjust a value of each of the first, second, third and fourth temperature levels TL1inc, TL2inc, TL2dec and TL1dec.

14. The method of claim 10, wherein the light source comprises a branch of a plurality of semiconductor-based light sources, and the method further comprises: providing a thermistor for sensing the temperature T in one of the branch of a plurality of semiconductor-based light sources or a substrate of the light source.

15. A method for producing an automotive lamp, the method comprising:
   providing a light source; and
   connecting an electronic circuit to drive the light source according to the method of claim 10.

16. The automotive lamp of claim 2, wherein the light source comprises a branch of a plurality of semiconductor-based light sources.

17. The automotive lamp of claim 2, wherein the electronic circuit does not comprise a microcontroller.

18. The automotive lamp of claim 2, wherein the automotive lamp is a rear fog lamp for a motor vehicle.

19. A motor vehicle comprising a rear fog lamp, the rear fog lamp comprising an automotive lamp of claim 2.

20. The method of claim 11, wherein the light source comprises a branch of a plurality of semiconductor-based light sources, and the method further comprises: providing a thermistor for sensing the temperature T in one of the branch of a plurality of semiconductor-based light sources or a substrate of the light source.

* * * * *